Patented Sept. 2, 1952

2,609,347

UNITED STATES PATENT OFFICE 2,609,347

METHOD OF MAKING EXPANDED POLY-VINYL ALCOHOL-FORMALDEHYDE REACTION PRODUCT AND PRODUCT RESULTING THEREFROM

Christopher Lumley Wilson, Notre Dame, Ind.

No Drawing. Application May 27, 1948, Serial No. 29,657

11 Claims. (Cl. 260—2.5)

This invention relates to the method of making an expanded material and to the product resulting therefrom. It particularly relates to the method of making a sponge material from the reaction product of a polyvinyl alcohol and formaldehyde or a material capable of releasing formaldehyde.

This application is a continuation-in-part of my copending application Serial No. 769,537, filed August 19, 1947, now abandoned.

One of the features of this invention is the provision of an improved method of making an expanded material comprising forming dispersed bubbles in a solution comprising polyvinyl alcohol and reacting the alcohol with formaldehyde or a material capable of releasing formaldehyde while the bubbles are present; another feature of the invention is the provision of a synthetic sponge material comprising a reaction product of polyvinyl alcohol and formaldehyde with this sponge material having interconnected pores therein capable of holding liquid and with the sponge material being resilient at least when wet and capable of resuming its original shape after an applied force has been removed; yet another feature of this invention is the provision of an improved porous sheet comprising polyvinyl formal that may be used as a wash cloth, synthetic chamois skin or the like. Other features and advantages of this invention will become apparent from the following description and the accompanying claims.

In preparing the improved sponge material of this invention, polyvinyl alcohol is reacted with formaldehyde in the presence of an acid catalyst while gas bubbles are present in the reacting mixture. Polyvinyl alcohol is the material that is produced by hydrolyzing a polyvinyl ester such as polyvinyl acetate. The formaldehyde may be supplied as a gas, a water solution of a gas, as paraformaldehyde, hexamethylenetetramine, and the like. Compounds of formaldehyde with alcohols such as methylal may also be employed, but these materials are somewhat more expensive than other sources of formaldehyde. Any material may be used so long as it is capable of supplying formaldehyde under the conditions of the reaction in order that the formaldehyde will react with the polyvinyl alcohol.

The polyvinyl alcohol is used in the form of a solution and preferably as a water solution thereof. The alcohol solution may be beaten or otherwise agitated in order to disperse bubbles therethrough and then reacted with the formaldehyde; or all the components of the reaction mixture may be mixed together and then beaten at the beginning of the reaction so as to form dispersed bubbles. The reaction is brought about under the influence of an acid catalyst. Any acid or acid liberating material may be used as the catalyst, but it is preferred that a mineral acid be employed. One of the most convenient mineral acids is sulfuric acid.

It is preferred that a wetting agent be used in order to aid in forming the bubbles and to make them more uniform in size and to obtain better dispersal of the bubbles in the mass. The wetting agent also aids in maintaining the froth with the bubbles dispersed substantially uniformly therethrough for a time that is sufficient for the reaction of the polyvinyl alcohol and formaldehyde to go to completion. When the solution comprising the polyvinyl alcohol is first frothed, the froth contains individual bubbles. As the reaction between the polyvinyl alcohol and the formaldehyde proceeds, these bubbles merge with each other in greater or lesser degree to make a porous structure that is capable of absorbing large quantities of water. Because of this porous condition, the finished sponge is resilient when wet and is capable of quickly recovering its shape when wet after an applied distorting force has been removed. The wetting agents can be used singly or in combinations of two or more.

Among the wetting agents that may be used are the following, arranged by number:

| Wetting Agent | Chemical Nature |
|---|---|
| 1 | "Span 20," sorbitan monolaurate. |
| 2 | "Tween 20," a polyoxyalkylene derivative of sorbitan monolaurate. |
| 3 | "Tween 60," a polyoxyalkylene derivative of sorbitan monostearate. |
| 4 | "Tween 80," a polyoxyalkylene derivative of sorbitan monooleate. |
| 5 | "Tween 81," a polyoxyalkylene derivative of sorbitan monooleate. |
| 6 | "Orvus WA," fatty alcohol sulfates, essentially sodium lauryl sulfates. |
| 7 | "Drene," fatty alsohol sulfates, essentially sodium lauryl sulfates. |
| 8 | "Dreft," fatty alcohol sulfates, essentially sodium lauryl sulfates. |
| 9 | "Igepon T," $C_{17}H_{33}CON(CH_3)C_2H_4SO_3Na$ |
| 10 | "Nekal BX," an alkali metal salt of di-isobutyl naphthalene sulfonate prepared by the method set out in U. S. Patent 1,737,792. |
| 11 | "Emulphor ON," a polyethylene ether of a long chain aliphatic alcohol prepared by the method set out in U. S. Patent 1,970,578. |
| 12 | "Emulphor OLA," a polyethylene ether of a long chain aliphatic acid prepared by the method set out in U. S. Patent 1,970,578. |
| 13 | 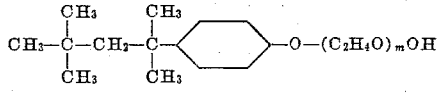 where $m$ averages between 10 and 11. |
| 14 | A product prepared by Example I of U. S. Patent 2,115,192, and having the formula: 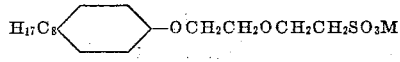 where M is an alkali metal such as sodium. |
| 15 | "Aerosol NC," an alkyl aryl sulfonate. |
| 16 | "Aerosol OS," diisopropyl naphthalene sodium sulfonate. |
| 17 | "Naccosol A," an alkali metal alkyl naphthalene sulfonate. |
| 18 | "Sapamine MS," 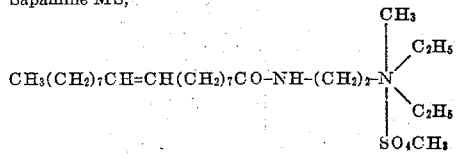 |
| 19 | An aliphatic sodium sulfonate prepared as by Examples 2 or 3 of U. S. Patent 2,370,421. |
| 20 | Saponin. |
| 21 | "Ultrawet 40," an alkyl aryl sulfonate such as $R'R^2R^3C_6H_2SO_3Na$, where $R'$, $R^2$ and $R^3$ are very short chains. |

The above wetting agents are commercial products that are frequently mixtures of closely related compounds resulting from their process of manufacture.

The bubbles may be formed by beating air into the mass in known manner by means of any desired beater. When this means is employed, it is preferred that the mass be beaten until it has attained its maximum volume. It will be found that after this maximum volume has been reached, further beating will have no appreciable effect on changing the volume of the mass.

The bubbles may also be formed by chemical means such as the use of powdered calcium carbonate, sodium bicarbonate, or a finely-divided metal such as magnesium, zinc, or the like. The acid of the acid catalyst reacts with these materials and thus releases the gas which becomes dispersed throughout the mass. It is preferred, however, that the bubbles be formed by beating as this is more convenient and cheaper.

Any primarily inorganic acid may be used as the acid catalyst so long as it has a dissociation constant of at least $10^{-2}$ and will not react or destroy any of the ingredients used in making the new expanded material. It has been discovered that the purely organic acids are not satisfactory but that acids having organic and inorganic groups in the molecule can be used if the inorganic groups are sufficiently acidic. Thus, the useful acid must be primarily inorganic. An example of this type of acid is p-toluene sulfonic acid. The inorganic or mineral acids that may be employed include sulfuric acid, hydrochloric acid, phosphoric acid and nitric acid. Although nitric acid is an oxidizing acid, it can be used in concentrations not appreciably above 12% by weight of the total amount of water present. The amount of acid that is used in any given instance is dependent upon the strength of the acid. Thus the weaker acids must be used in concentrations greater than those in which the strong acids are used. The preferred concentration of acids will be in general between 6 and 45% based on the total amount of water present. In general, sulfuric acid is preferred because of its ready availability, cheapness and strength. When sulfuric acid is employed, its preferred concentration range is 10 to 30% by weight of the total amount of water present. This same preferred range may be used for hydrochloric acid where the acid is in the form of a 35 to 37% solution by weight of hydrogen chloride gas in water. This preferred range of concentration for hydrochloric acid does not include the water present in the hydrochloric acid solution.

Various grades of polyvinyl alcohols may be used with these grades differing in molecular weight. The various grades are known commercially as high, medium and low molecular weights. The most satisfactory way of indicating the molecular weight is the number average molecular weight. The number average molecular weight of the high molecular polyvinyl alcohol is approximately 52,000, the medium 40,000 and the low 14,000. These molecular weights, however, can be varied considerably and produce excellent sponges. The molecular weight may also be indicated as the viscosity of a 4% by weight aqueous solution of the alcohol when measured in a Höeppler viscosimeter at 20° C. Under these conditions the low molecular weight alcohol solution will have a viscosity of about 5, the medium of about 24 and the high of about 55. The polyvinyl alcohol that is used preferably has less than 10% residual hydrolyzable material in the molecule. It is preferred that there be less than 1 or 2% of this residual material.

In preparing the new sponge, it is preferred that from 35 to 80% of the hydroxyl groups be reacted with the formaldehyde. A better grade sponge is prepared if this range is between 40 and 70%.

The grade of polyvinyl alcohol that is used will determine the amount of formaldehyde needed in the reaction, the percentage of the hydroxyl groups that are reacted and the toughness of the resulting product. In general, it may be said that the higher the molecular weight of the alcohol the lower is its solubility in water and the lesser the activity of the alcohol toward the formaldehyde. The higher molecular weight alcohols, however, result in a tougher sponge.

In one manner of practicing the invention, an aqueous solution of polyvinyl alcohol is mixed with formaldehyde and acid and a wetting agent. The mixture is beaten to a froth with a high speed rotary beater. The froth is then poured into a mold and permitted to set. While in the mold, the polyvinyl alcohol and the formaldehyde react to produce a polyvinyl formal. The reaction is permitted to progress until from approximately 35 to 80% of the hydroxyl groups of the polyvinyl alcohol have been reacted with the formaldehyde. At the end of the reaction time, the resulting sponge is removed from the mold and washed with water until substantially free from acid, unreacted polyvinyl alcohol, formaldehyde, and the like. A satisfactory sponge material is flexible when wet with water and rapidly absorbs an amount of water that is only a little less than its own volume. It is sufficiently strong to withstand a considerable amount of abrasion and has a high tensile strength. The sponge materials made in this manner have been found to be more wear resistant than a natural sponge and to be unaffected by strongly acid or alkaline solutions which rapidly disintegrate a natural sponge.

The most stable froth is that froth which is as stiff as possible. It has been discovered that increasing the amounts of acid or water or acid and water increases the amount of froth. If the amount of froth is increased too greatly, however, the resulting sponge will be weak. The apparent specific gravity of the final sponge, including the pores, is preferably from 0.03 to 0.15. In actual commercial production, it has been found that the most satisfactory bulk sponges have apparent specific gravities between about 0.05 and 0.06. In preparing the solutions from which the froth is made, it is preferred that the solution contain between about 5 and 25% of polyvinyl alcohol by weight of water. A higher concentration of the low molecular polyvinyl alcohol will be required than of the medium and high and a higher concentration of the medium will be required than of the high.

The reaction time and temperature are inversely dependent upon each other so that if a relatively low temperature is used, a relatively long reacting time is necessary; conversely, when the temperature is relatively high, the reacting time is considerably reduced. It is generally preferred that a temperature between about 20 and 60° C. be employed. Other temperatures may, of course, be used, but with extremely low temperatures, relatively great lengths of time are required. Where extremely high temperatures are employed, there is the problem of obtaining uniform heating throughout the mass of froth. It is, of course, true that froth containing dispersed bubbles of air or other gas is a very poor conductor of heat. It has been found that in varying the temperature 10°, for example, a time factor of 2 or 3 is required. Thus, in one embodiment where heating the froth at 60° C. required two hours for completion of the reaction, heating at 50° required six hours, at 40° C.—18 hours, and at 30° C.—54 hours. The concentration of the acid catalyst also affects the time of reaction. Thus, a given reaction takes place about twice as fast with 20% acid as with 14% acid; both percentages being by weight of the total amount of water present. All these factors and variables are well understood by those skilled in the art.

After forming bubbles of air or other gas in the reaction mixture, it is found that as the reaction proceeds, the adjacent bubbles merge with each other to form pores or openings in the material. When the reaction is complete, it will be found that the mass of material contains large numbers of interconnected pores with the outer ends of the pores that are adjacent the outer surface of the sponge being open. If a thin skin should be formed over the outer surface of the sponge material, this may be removed by cutting it away to expose the pores. Because of the large number of pores, the sponge material will be capable of absorbing almost its own volume of water.

By limiting the reaction so that not less than 35% nor more than 80% of the hydroxyl groups of the polyvinyl alcohol are reacted, a tough resilient sponge is produced. The sponge, when dry, is somewhat hard and resistant to compression. However, after it has been wet with water, it becomes quite soft and resilient.

In order to produce a satisfactory sponge, it is necessary that the bubbles in the reacting mass merge to a certain degree with each other during the reaction. Thus, the original dispersion of bubbles or froth must not be too stable so that the final bubbles are small and discrete and also must not be so unstable that the mass has collapsed before the reaction has proceeded sufficiently to give rigidity to the mass. These factors are largely determined by the stability of the froth and this can easily be controlled by the type and amount of wetting agent used. For any given grade of polyvinyl alcohol and for any type of wetting agent, the optimum amounts may be easily determined by those skilled in the art. The wetting agents that are employed are those that retain their surface active properties in the presence of formaldehyde and acid, and include large numbers of commercial agents.

The reacting materials are maintained in molds of desired shape during the reaction. These molds may be of any desired material that is resistant to acid and to formaldehyde. The molds may be made of glass, earthenware, wood, acid resistant metal, synthetic plastics, rubber, and the like.

In one method of making the new sponge, the desired amount of polyvinyl alcohol was added to the desired amount of water in a heated vessel equipped with agitation. The alcohol and water were heated and mixed until the alcohol was completely dissolved in the water. The alcohol solution was then transferred to storage and cooling vats. Portions of the alcohol solution were withdrawn and each portion was mixed with a formaldehyde compound, such as paraformaldehyde, a wetting agent and an acid. This mixing was preferably done in a relatively small container equipped with a beater. The solution was beaten until the resulting froth attained a maximum volume. At the end of this time, the froth was poured into wooden molds which were transferred to a heated room and left there until the mass was sufficiently reacted. After the completion of the reaction, the sponge material was removed from the molds and washed to remove the acid and other unreacted materials. At the end of this washing operation, the blocks of sponge were cut into proper size ready for packaging.

The sponge material may be colored with acid stable pigments, or dyed with substantive dyes or vat dyes. Thus, the coloring agents may be added with the other ingredients at the beginning of the manufacturing operation and dispersed through the reaction mixture during the beating or other frothing operations. The substantive and vat dyes, however, are preferably incorporated after the sponges have been made. The ordinary water-soluble cotton dyes may be used for coloring the sponges. As examples of the coloring agents, a blue color may be produced by using a phthalocyanine compound, a brown, orange or red color from suitable iron oxide and a green color from chromic oxide. There are, of course, many other dyes and coloring agents that may be employed.

If desired, inert fillers may be introduced into the sponge with these fillers preferably being mixed in the solution prior to the agitation thereof. Practically any inert filler may be employed. These include wood flour, glass wool, various earths, such as kieselguhr, and the like. In order that the sponge will not be undesirably weakened, it is preferred that an excessive amount of fillers not be employed. The filler may be or include an abrasive, such as pumice, if desired, so that the resulting sponge will have an abrasive surface.

In preparing the sponges by the methods of this invention, the polyvinyl alcohol may be dissolved in water, the wetting agent added and the mixture then beaten to a froth before adding the acid and the formaldehyde. The froth is then again beaten to disperse the formaldehyde and acid. It is preferred that the formaldehyde be added after the initial frothing. If desired, however, all ingredients may be first mixed together before the bubbles are formed. A total amount of water or other solvent is preferably used so that the froth is capable of being maintained at approximately a constant volume during the reaction and so that the froth is sufficiently fluid to be poured into the molds after the frothing and before the reaction has progressed an appreciable extent.

The new sponge materials may be used to make porous sheets that are usable as wash cloths or artificial chamois skins. Where this is done the sponge material is sliced into sheets and these sheets pressed lightly with a weight while being heated. The temperature that is used should not be high enough to scorch the sponge material, but should be sufficiently high to soften and mold the material. It has been discovered that this temperature should be less than 160–180° C. as at these temperatures the sponge material will be scorched quite easily. A preferred temperature is between 100–120° C. The pressure that is applied will depend upon the desired porosity of the final sheet and the depth thereof. In one example, this pressure was sufficient to reduce the thickness of the sheet to about one-third its original thickness. Ordinarily the specific gravity of the resulting sheet material will be about between 0.09 and 0.15. The small voids in the sheet material will be found to have become generally elliptical in a direction substantially parallel to the surface where the heat and pressure were applied due to the heating and pressing operation. The sides of these voids will generally not be adhered to each other so that the sheet material is quite resilient when wet and is capable of absorbing large quantities of water. When the sponge material is to be used for making sheet material, it is preferred that the voids be relatively small and uniform so that no holes or excessively weak points will be produced in the material.

The following examples illustrate several typical methods of preparing the new expanded materials. These are merely illustrative, however, and are not to be considered as a limitation upon the disclosure of the invention. It is believed obvious that the numbers and types of possible examples are practically limitless. Of the examples listed below, the first eight are similar to the examples of the copending application Serial No. 769,537 of which this application is a continuation-in-part. In the earlier application, commercial polyvinyl alcohol was used and this material had additional constituents unknown to me at that time. The present examples are based on a more pure polyvinyl alcohol and thus some of the amounts of certain of the ingredients differ from those given in the corresponding examples of the earlier case. In the examples, the wetting agents are indicated by number as listed in the table presented hereinabove. This is more convenient than listing the individual chemical compounds.

*Example 1*

20 grams of polyvinyl alcohol of high molecular weight were dissolved in 200 cc. of water at 85° C. 35 cc. of 95% sulfuric acid were added, the solution was cooled to room temperature and 24.5 cc. of a 37% aqueous solution of formaldehyde and 0.65 grams of wetting agent No. 2 were added. The mixture was beaten with a rotary beater until it had attained a volume of 580 cc. The froth was poured into a mold and permitted to stand at 25° C. for 24 hours. At the end of this time, the resulting sponge was removed and washed to remove unreacted formaldehyde and polyvinyl alcohol and to remove the acid catalyst. About 56.7% of the hydroxyl groups of the alcohol had been reacted.

*Example 2*

20 grams of polyvinyl alcohol of medium molecular weight were dissolved in 155 cc. of water, and 30 cc. of 95% sulfuric acid were added. The solution was cooled to room temperature and 4 grams of wetting agent No. 19 and 17.2 cc. of 37% formalin were added. The mass was frothed to a volume of 560 cc. This froth was poured in a mold and permitted to stand for 18 hours at 30° C. At the end of this time, the sponge was removed and washed.

*Example 3*

Example 2 was repeated except that wetting agent No. 20 was used as the wetting agent and the sponge was permitted to stand at 60° for 85 minutes. At the end of this time, the sponge was washed and it was found to be capable of absorbing 12 times its own weight of water. About 64.7% of the hydroxyl groups had been reacted with formaldehyde.

*Example 4*

15 grams of low molecular weight polyvinyl alcohol and 5 grams of medium molecular weight polyvinyl alcohol were mixed and dissolved in 100 cc. of water. 0.5 gram of wetting agent No. 6, 40 cc. of 55% sulfuric acid and 24.5 cc. of a 37% aqueous solution of formaldehyde were added. The mixture was beaten until it had attained a volume of 400 cc. The froth was poured into a mold and permitted to stand at 25° C. for 20 hours. The sponge was removed from the mold and washed.

*Example 5*

20 grams of medium molecular weight polyvinyl alcohol were dissolved in 140 cc. of water and the solution was mixed with 23 cc. of 95% sulfuric acid and cooled to room temperature. Then 25 cc. of a 37% aqueous solution of formaldehyde and 0.4 gram of wetting agent No. 10 were added. The mixture was frothed to a volume of 620 cc. The froth was poured into a mold and permitted to set for 18 hours at 25° C. The resulting sponge was removed from the mold and washed and was found to be a good sponge of excellent quality.

Example 6

10 grams of medium molecular weight polyvinyl alcohol were dissolved in 100 cc. of water, and 3 grams of wetting agent No. 20, 17.2 cc. of a 37% aqueous solution of formaldehyde and 8.5 cc. of 95% sulfuric acid were added. The mixture was cooled to room temperature and then beaten by a rotary beater until it had attained a volume of about 380 cc. The resulting froth was poured into a mold and permitted to stand for 19 hours at 20° C. At the end of this time, the sponge was removed and washed free of acid, unreacted polyvinyl alcohol and unreacted formaldehyde. The resulting sponge had 65% of its hydroxy groups reacted and had a volume of about 350 cc. when wet.

Example 7

The procedure of Example 6 was repeated except that 10 cc. of 95% sulfuric acid was employed instead of 8.5 cc. This amount resulted in a satisfactory sponge after the froth had been permitted to stand for two hours at 60° C.

Example 8

130 cc. of a 14.5% by weight aqueous solution of polyvinyl alcohol of medium molecular weight were mixed with 30 cc. of water, 28 cc. of 95% sulfuric acid, 8 g. hexamethylene-tetramine and wetting agent No. 14 (2 g.); the mixture was cooled to room temperature, and beaten to a froth. The froth, which had a volume of 400 cc., was permitted to stand for 18 hours at 25° C.

Example 9

124 grams of a 15.4% solution of medium molecular polyvinyl alcohol were mixed with 0.75 g. of wetting agent No. 13, 25 grams of p-toluene sulfonic acid, 9 cc. water and 12 grams of p-formaldehyde. The resulting solution was cooled to room temperature and beaten to a froth. This froth which had a volume of 650 cc. was permitted to stand at room temperature for 48 hours for completion of the reaction.

Example 10

117 grams of a 14½% aqueous solution of medium molecular weight polyvinyl alcohol were mixed with 1.1 g. of wetting agent No. 13, 16.5 cc. of a 70% solution of nitric acid and 12 grams of a formaldehyde. The resulting solution was beaten to a froth of 700 cc. and permitted to stand for 20 hours at room temperature.

Example 11

124 grams of 15.4% aqueous solution of medium molecular weight polyvinyl alcohol were mixed with 49 cc. of 37% hydrochloric acid solution, 9 cc. water, 1.2 g. wetting agent No. 13 and 20 grams of methylal. The resulting solution was beaten to a froth of 800 cc., and the froth was permitted to stand for 20 hours at room temperature.

Example 12

124 grams of 15.4% aqueous solution of medium molecular weight polyvinyl alcohol were mixed with 49 cc. of 37% hydrochloric acid, 9 cc. of water, 0.1 gram of wetting agent No. 10, 0.15 g. of wetting agent No. 13 and 8 grams p-formaldehyde. The resulting solution was beaten to a froth of 560 cc. and this froth was permitted to stand for 20 hours at room temperature, at the end of which time the reaction was complete.

Example 13

The procedure of Example 12 was repeated except that 0.5 gram of wetting agent No. 9 and 0.3 g. of wetting agent No. 18 were used as the wetting agents.

Example 14

117 grams of 14.5% aqueous solution of medium molecular weight polyvinyl alcohol were mixed with two grams of finely cut glass wool (⅛ to ¼ inch fibers), 45 cc. of a 55% aqueous sulfuric acid solution, 10 cc. of water, 1.2 g. wetting agent No. 13 and 8 grams of p-formaldehyde. The mixture was beaten to a froth of 830 cc. and the froth was permitted to stand for 20 hours at room temperature.

Example 15

117 grams of 14.5% solution of a medium molecular weight polyvinyl alcohol were mixed with 45 cc. of 85% phosphoric acid solution, 1.25 g. of wetting agent No. 13 and 12½ grams of p-formaldehyde. The solution was beaten to a froth of 670 cc. and the froth was permitted to stand for 20 hours at room temperature.

Example 16

20 grams of powdered medium molecular weight polyvinyl alcohol were added to a solution of 15 cc. of a 95% sulfuric acid in 160 cc. of water. This solution was beaten to a volume of about 200 cc. and 1.3 g. of wetting agent No. 13 were added to the solution. This solution was then beaten to a stable froth of 750 cc. and p-formaldehyde added thereto. The froth was again beaten to insure even distribution of the formaldehyde and the resulting froth was permitted to stand for 24 hours at room temperature.

Example 17

130 grams of a 14.8% solution of medium molecular weight polyvinyl alcohol were mixed with 40 cc. of 48%, by weight, aqueous hydrobromic acid solution and 1.3 grams of wetting agent No. 13. The resulting solution was beaten into a froth having a volume of 800 cc. 8 grams of p-formaldehyde were added and the froth beaten for approximately two minutes longer to distribute the p-formaldehyde evenly through the mass. The froth was poured into a mold and permitted to stand for twenty hours at 20° C. to complete the reaction.

Example 18

75 grams of a 14.5% solution of medium molecular weight polyvinyl alcohol were mixed with 0.9 gram of wetting agent No. 13 and 70 cc. of a 55% aqueous sulfuric acid solution. This mixture was beaten to a froth having a volume of approximately 500 cc. 3.6 grams of p-formaldehyde were added and the mixture beaten for about 1½ minutes longer. The froth was poured into a mold and permitted to stand for 20 hours at 20° C. to complete the reaction. At the end of this time, the sponge material was removed from the mold, washed and cut into sheets about ⅛ inch thick. These sheets were pressed damp at about 120° C. under sufficient pressure and for a sufficient time to reduce the thickness of the sheets to about ⅓ of their original thickness. The resulting sheets were porous and absorbent and flexible when wet.

In each of the above examples, the sponge material was washed free of acid and other nonreacted ingredients at the end of the reaction time. The sponge material was then cut up into proper sizes for packaging.

Having described my invention as related to various embodiments of the same, it is my intention that the invention be not limited by any of the details of description unless otherwise specified, but rather be construed broadly within its spirit and scope as set out in the accompanying claims.

I claim:
1. The method of making a sponge material having interconnected pores by reacting polyvinyl alcohol and formaldehyde, which comprises: providing an aqueous solution of formaldehyde, polyvinyl alcohol containing less than 10% residual hydrolyzable material in the molecule, an acid catalyst in which the acid functional group is inorganic and having a dissociation constant of at least $10^{-2}$ and a froth-stabilizing wetting agent soluble in and substantially stable to said solution; forming a substantially stable and homogeneous froth with said solution stabilized with the wetting agent; reacting the polyvinyl alcohol and formaldehyde in the solution thereby causing gellation and solidification of the froth with the production of interconnected pores simultaneously with the progression of the reaction, the froth being formed prior to appreciable reaction between the polyvinyl alcohol and the formaldehyde; and stopping said reaction when approximately 35-80% of the hydroxyl groups of the polyvinyl alcohol have been reacted with the formaldehyde.

2. The method of making a sponge material having interconnected pores by reacting polyvinyl alcohol and formaldehyde, which comprises: providing an aqueous solution of formaldehyde, polyvinyl alcohol containing less than 10% residual hydrolyzable material in the molecule, an acid catalyst in which the acid functional group is inorganic and having a dissociation constant of at least $10^{-2}$ and a froth-stabilizing wetting agent soluble in and substantially stable to said solution; beating said solution to form a substantially stable and homogeneous froth stabilized with the wetting agent; reacting the polyvinyl alcohol and formaldehyde in the solution thereby causing gellation and solidification of the froth with the production of interconnected pores simultaneously with the progression of the reaction, the froth being formed prior to appreciable reaction between the polyvinyl alcohol and the formaldehyde; and stopping said reaction when approximately 35-80% of the hydroxyl groups of the polyvinyl alcohol have been reacted with the formaldehyde.

3. The method of making a sponge material having interconnected pores by reacting polyvinyl alcohol and formaldehyde, which comprises: providing an aqueous solution of formaldehyde, polyvinyl alcohol containing less than 10% residual hydrolyzable material in the molecule, an acid catalyst in which the acid functional group is inorganic and having a dissociation constant of at least $10^{-2}$ and a froth-stabilizing wetting agent soluble in and substantially stable to said solution; forming a substantially stable and homogeneous froth with said solution stabilized with the wetting agent; reacting the polyvinyl alcohol and formaldehyde in the solution thereby causing gellation and solidification of the froth with the production of interconnected pores simultaneously with the progression of the reaction, the froth being formed prior to appreciable reaction between the polyvinyl alcohol and the formaldehyde; and stopping said reaction when approximately 40-70% of the hydroxyl groups of the polyvinyl alcohol have been reacted with the formaldehyde.

4. The method of making a sponge material having interconnected pores by reacting polyvinyl alcohol and formaldehyde, which comprises: providing an aqueous solution of formaldehyde, polyvinyl alcohol containing less than 2% residual hydrolyzable material in the molecule, an acid catalyst in which the acid functional group is inorganic and having a dissociation constant of at least $10^{-2}$ and a froth-stabilizing wetting agent soluble in and substantially stable to said solution; beating said solution to form a substantially stable and homogeneous froth stabilized with the wetting agent; reacting the polyvinyl alcohol and formaldehyde in the solution thereby causing gellation and solidification of the froth with the production of interconnected pores simultaneously with the progression of the reaction, the froth being formed prior to appreciable reaction between the polyvinyl alcohol and the formaldehyde; and stopping said reaction when approximately 40-70% of the hydroxyl groups of the polyvinyl alcohol have been reacted with the formaldehyde.

5. The method of making a sponge material having interconnected pores by reacting polyvinyl alcohol and formaldehyde, which comprises: providing an aqueous solution of formaldehyde, polyvinyl alcohol containing less than 10% residual hydrolyzable material in the molecule, an acid catalyst in which the acid functional group is inorganic and having a dissociation constant of at least $10^{-2}$ and a froth-stabilizing wetting agent soluble in and substantially stable to said solution; forming a substantially stable and homogeneous froth with said solution stabilized with the wetting agent; reacting the polyvinyl alcohol and formaldehyde in the solution thereby causing gellation and solidification of the froth with the production of interconnected pores simultaneously with the progression of the reaction, the froth being formed prior to appreciable reaction between the polyvinyl alcohol and the formaldehyde; stopping said reaction when approximately 35-80% of the hydroxyl groups of the polyvinyl alcohol have been reacted with the formaldehyde; and applying pressure to the resulting sponge material while heating at a temperature sufficient to give the material a permanent set but insufficient to cause scorching.

6. The method of making a sponge material having interconnected pores by reacting polyvinyl alcohol and formaldehyde, which comprises: providing an aqueous solution of formaldehyde, polyvinyl alcohol containing less than 10% residual hydrolyzable material in the molecule, an acid catalyst in which the acid functional group is inorganic and having a dissociation constant of at least $10^{-2}$ and a froth-stabilizing wetting agent soluble in and substantially stable to said solution, said acid catalyst being a member of the class consisting of acids other than oxidizing acids present in an amount of about 6-45% by weight of the water present and oxidizing acids present in an amount of about 6-12% by weight of the water present; forming a substantially stable and homogeneous froth with said solution stabilized with the wetting agent; reacting the polyvinyl alcohol and formaldehyde in the solution thereby causing gellation and solidification of the froth with the production of interconnected pores simultaneously with the progression of the reaction, the froth being formed prior to appreciable reaction between the polyvinyl alcohol and the formaldehyde; and stopping said reaction when approximately 35-80% of the hydroxyl groups of the polyvinyl alcohol have been reacted with the formaldehyde.

7. The method of making a sponge material having interconnected pores by reacting polyvinyl alcohol and formaldehyde, which comprises: providing an aqueous solution of formaldehyde, polyvinyl alcohol containing less than 10% residual hydrolyzable material in the molecule, an acid catalyst in which the acid functional group is inorganic and having a dissociation constant of at least $10^{-2}$ and a froth-stabilizing wetting agent soluble in and substantially stable to said solution, said acid catalyst being a member of the class consisting of acids other than oxidizing acids present in an amount of about 6-45% by weight of the water present and oxidizing acids present in an amount of about 6-12% by weight of the water present; beating said solution to form a substantially stable and homogeneous froth stabilized with the wetting agent; reacting the polyvinyl alcohol and formaldehyde in the solution thereby causing gellation and solidification of the froth with the production of interconnected pores simultaneously with the progression of the reaction, the froth being formed prior to appreciable reaction between the polyvinyl alcohol and the formaldehyde; and stopping said reaction when approximately 35-80% of the hydroxyl groups of the polyvinyl alcohol have been reacted with the formaldehyde.

8. The method of making a sponge material having interconnected pores by reacting polyvinyl alcohol and formaldehyde, which comprises: providing an aqueous solution of formaldehyde, polyvinyl alcohol containing less than 2% residual hydrolyzable material in the molecule, an acid catalyst in which the acid functional group is inorganic and having a dissociation constant of at least $10^{-2}$ and a froth-stabilizing wetting agent soluble in and substantially stable to said solution, said acid catalyst being a member of the class consisting of acids other than oxidizing acids present in an amount of about 6-45% by weight of the water present and oxidizing acids present in an amount of about 6-12% by weight of the water present; beating said solution to form a substantially stable and homogeneous froth stabilized with the wetting agent; reacting the polyvinyl alcohol and formaldehyde in the solution thereby causing gellation and solidification of the froth with the production of interconnected pores simultaneously with the progression of the reaction, the froth being formed prior to appreciable reaction between the polyvinyl alcohol and the formaldehyde; and stopping said reaction when approximately 40-70% of the hydroxyl groups of the polyvinyl alcohol have been reacted with the formaldehyde.

9. The method of making a sponge material having interconnected pores by reacting polyvinyl alcohol and formaldehyde, which comprises: providing an aqueous solution of formaldehyde, polyvinyl alcohol containing less than 10% residual hydrolyzable material in the molecule, an acid catalyst in which the acid functional group is inorganic and having a dissociation constant of at least $10^{-2}$ and a froth-stabilizing wetting agent soluble in and substantially stable to said solution, said acid catalyst being a member of the class consisting of acids other than oxidizing acids present in an amount of about 6-45% by weight of the water present and oxidizing acids present in an amount of about 6-12% by weight of the water present; forming a substantially stable and homogeneous froth with said solution stabilized with the wetting agent; reacting the polyvinyl alcohol and formaldehyde in the solution thereby causing gellation and solidification of the froth with the production of interconnected pores simultaneously with the progression of the reaction, the froth being formed prior to appreciable reaction between the polyvinyl alcohol and the formaldehyde; stopping said reaction when approximately 35-80% of the hydroxyl groups of the polyvinyl alcohol have been reacted with the formaldehyde; and applying pressure to the resulting sponge material while heating at a temperature sufficient to give the material a permanent set but insufficient to cause scorching.

10. A sponge material prepared by the method of claim 1.

11. A sponge material prepared by the method of claim 8.

CHRISTOPHER LUMLEY WILSON.

REFERENCES CITED

The following references are of record in the file of this patent:

UNITED STATES PATENTS

| Number | Name | Date |
|---|---|---|
| Re. 20,430 | Morrison et al. | June 29, 1937 |
| 2,056,796 | Macht | Oct. 6, 1936 |
| 2,077,298 | Zelger | Apr. 12, 1937 |
| 2,083,628 | Zelger | June 15, 1937 |
| 2,376,653 | Boyer | May 22, 1945 |
| 2,386,995 | Wigal | Oct. 16, 1945 |
| 2,405,345 | Cooper | Aug. 6, 1946 |
| 2,478,879 | Ten Broeck | Aug. 9, 1949 |

FOREIGN PATENTS

| Number | Country | Date |
|---|---|---|
| 769,011 | France | Aug. 17, 1934 |
| 114,829 | Australia | Mar. 4, 1942 |
| 573,966 | Great Britain | Dec. 14, 1945 |
| 578,525 | Great Britain | July 2, 1946 |
| 578,884 | Great Britain | July 16, 1946 |

OTHER REFERENCES

Gould, Rubber Age, March 1944, pp. 526 and 527.